United States Patent

Norris

[15] 3,641,524

[45] Feb. 8, 1972

[54] MAGNETIC RECORD AND REPRODUCE SYSTEM FOR DIGITAL DATA HAVING A NRZC FORMAT

[72] Inventor: Kermit A. Norris, Azusa, Calif.

[73] Assignee: Leach Corporation, South Pasadena, Calif.

[22] Filed: Feb. 13, 1970

[21] Appl. No.: 8,123

Related U.S. Application Data

[62] Division of Ser. No. 592,458, Nov. 7, 1966, Pat. No. 3,518,648.

[52] U.S. Cl. ....................340/174.1 H

[51] Int. Cl. ....................G11b 5/02

[58] Field of Search....................340/174.1 G, 174.1 H

[56] References Cited

UNITED STATES PATENTS 3,356,934 12/1967 Halfhill et al. ....................340/174.1 G
3,357,003 12/1967 MacArthur ....................340/174.1 G
3,377,583 4/1968 Sims, Jr. ....................340/174.1 G
3,217,329 11/1965 Gabor ....................340/174.1

*Primary Examiner*—Bernard Konick
*Assistant Examiner*—Vincent P. Canney
*Attorney*—Jackson & Jones

[57] ABSTRACT

Apparatus for recording and reproducing digital data on a magnetic medium is disclosed. The apparatus operates to convert data in a NRZC format to a NRZ-S format and then to a SφM format for recordation. Reproduced signals are reconverted from the SφM format to a NRZ-S format. The reproduced signals are then filtered and threshold detected to derive the original data in NRZC format.

7 Claims, 7 Drawing Figures

INVENTOR.
KERMIT A. NORRIS
BY Jackson & Jones
ATTORNEYS.

MAGNETIC RECORD AND REPRODUCE SYSTEM FOR DIGITAL DATA HAVING A NRZC FORMAT

BACKGROUND OF THE INVENTION

1. Field of the Invention

This is a division of application Ser. No. 592,458, filed Nov. 7, 1966, now U.S. Pat. No. 3,518,648, issued June 30, 1970.

This invention relates in general to method and apparatus for improving the packing density of digital data on a magnetic storage medium. More particularly, this invention relates to new and improved data formats including digital-to-carrier-to-digital conversions which are applicable to magnetic storage mediums such as magnetic tapes, magnetic drums, disk files and the like.

2. Description of the Prior Art

Storage on a magnetic surface has been under intensive study for many years. A thin layer of magnetic material is deposited on a surface and a magnetic head is employed to magnetize areas or spots on the magnetic layer. The magnetic flux pattern at such areas or spots indicates whether a "0" or a "1" digit is stored in a particular area of the layer. Relative motion between the magnetic layer of the surface and the same or a similar head is employed to recover the data in the form of induced voltages resulting from changing flux lines cutting across a gap in the head. The induced voltages are indicative of the value of the date stored on the areas or spots provided that the bit positions may, during subsequent recovery operations, be ascertained.

During the past decade numerous improvements in the quality of magnetic coatings and the characteristics of magnetic heads have been developed. In spite of these many improvements, the packing density of binary information on a magnetic surface has not shown a corresponding increase; but, rather, has increased very little. For example, in chapter 7 of "Digital Computer Components and Circuits" by R. K. Richards, pgs. 314–353, a thorough discussion of the then presently known digital data handling techniques, resulted in recorded pulse density of approximately 1,150 bits per inch for contact-type heads and magnetic tape. The state of the art, prior to the advent of this invention and during the past decade has only managed to increase the bit density to approximately 2,730 bits per inch, per track, in a highly specialized piece of equipment for spacecraft use. For example, in the Aug. 24, 1964 issue of "Electronics," a recorder-reproducer for the Gemini project achieves a packing density of 2,730 bits per linear inch per track. This packing density is there represented as being nearly twice the highest packing density available in standard magnetic recorders, and is further represented as being 2½ times the highest packing density which is available in telemetry recorders.

The foregoing prior art systems for storing information on a magnetic surface may be classed broadly as falling within one of two typical approaches. These two approaches involve either a "recorded clock" or a "derived clock." In the prior art approach, utilizing a "recorded clock," the clock source which is available for clocking digital data during a record operation, is itself recorded on a separate track on the magnetic surface. This clock track may then be recovered along with the data in a subsequent data recovery operation. This "recorded clock" approach allows each pulse of the reference clock to establish the bit cell period for the data stored in its separate track on the magnetic surface.

In the "derived clock" technique, timing is provided in the form of a phase-locked oscillator which is triggered by manipulation of the stored data itself following recovery of such stored data from the magnetic surface of a tape. As another alternative to this second "derived clock" approach of the prior art's attempt to eliminate a recorded clock reference, a series of unique bits are stored in the data track prior to the first information bit of data to be stored. These unique bits, when recovered, are used to trigger an external timing source such as a phase-locked oscillator. Although not strictly a clock reference in the sense described above for the "recorded clock" approach, this second prior art approach is nevertheless dependent upon a timing mechanism of one sort or another. High packing densities are hindered because the data must be programmed before it is stored on the tape. Thus, the data is normally divided into blocks and the unique bits are recorded between data blocks so that the external clock can continually be updated and kept in synchronism with the data locations. Much data recording space is lost. The programming of data for write operations is a costly and complex approach. Further, in spite of this expense and complexity, much data is lost from blocks between the unique bits because the absence of a bit due to dirt, head displacement, etc., will be represented as a phase displacement in the reference signal and erroneous readings during the remainder of the data block occur.

In either the "recorded clock" or "derived clock" approaches of the prior art, a recovery operation of stored data must rely on the timing source for establishing bit cell locations. These bit cell intervals allow some form of integration, rectification, or peak detection operation to take place on the signals recovered from the magnetic medium so that the digital levels there represented are derived and are available for digital data utilization circuits.

SUMMARY OF THE INVENTION

I have discovered that the reliance on and necessity for a clock reference to maintain time relationship of the data locations is one of several critical factors that has seriously hindered high packing density of prior art approaches. Regardless of whether the reference clock is recorded on the magnetic surface itself, or whether it is derived from the stored data, this reference makes recovery of the data difficult, and leads to erroneous readings because of a missing bit of data may be interpreted as a phase displacement of the clock reference signal and all further readings will be erroneous. Furthermore, the prior art techniques of data recovery operations including rectification, integration, peak detection, and the like, are all dependent upon a clocked reference of some sort and thus suffer the same high density limitations mentioned hereinbefore.

The foregoing disadvantages of the prior art are avoided in accordance with the principles of this invention wherein a new and unique format and new and unique methods are employed to provide storage on a magnetic surface. Higher packing densities than were heretofore thought possible are readily provided. At least one, and in one embodiment, two binary bits per cycle of available bandwidth of the storage system is possible. The bandwidth of any storage and recovery system for a magnetic surface is a function of the magnetic material, relative speed of movement of the surface past the read and write heads, the head design and associated material, and other parameters of the system itself. For example, the state of the art recorders today present a bandwidth of approximately 15,000 cycles per second at a signal to noise ratio of approximately 18 to 20 decibels. In accordance with the techniques of this invention, I have stored and recovered with extremely low error rates, digital data having packing densities of 30,000 bits per inch per track on a magnetic surface. It should be understood that with the techniques of this invention, the packing density is limited only by the bandwidth of the storage and recovery system and such bandwidth is constantly improving. Reliance on any timing reference is eliminated in accordance with the principles of my invention. Also eliminated are clock dependent operations such as integration, rectification, peak detection and the like previously required for data recovery. It is the elimination of these critical factors which allows improvement by a magnitude of at least ten over all known prior art techniques.

In accordance with the principles of my invention, digital data, of either NRZ or RZ type wherein data is represented by discrete levels, is converted by a format control into a continuous signal which contains the digital data in the form of frequency, or phase, variations thereof. This modulated signal is stored by conventional means on a conventional magnetic medium, and conventional means are employed to recover this modulated signal. Once recovered it is applied to means for delaying the information signal a fixed integer amount other than zero which integer amount is equal to, or is a multiple of, the period, or duration, of the bit cells of the recorded digital data. Means are provided for comparing the delayed signal with the recovered signal. The output of this comparison circuit mixes the delayed and nondelayed signals and restores phase variations therein to the original digital data format.

BRIEF DESCRIPTION OF THE DRAWINGS

The foregoing and other objects and features of this invention may more readily be appreciated when taken in conjunction with the following description of the figures in which:

Turning now to the drawing, FIG. 1 depicts a record channel 20 and a reproduce channel 50 for respectively recording and reproducing data on a magnetic surface 30. This magnetic surface 30 may be any magnetic coating such as oxide coatings utilized on storage members including tape, drums, disk files or the like.

In accordance with the principles of this invention, a source 21 supplies digital data having at least two discrete levels. Such digital data may, for example, be nonreturn to zero data (NRZ) or return to zero (RZ) data. Thus, for purposes of example only, digital data from source 21 may be nonreturn to zero change (NRZC) format as shown in row 1 of FIG. 1A. In this digital format, data is represented by two distinct levels wherein a "1" is represented by one level and a "0" is represented by a second level.

Figure 1:
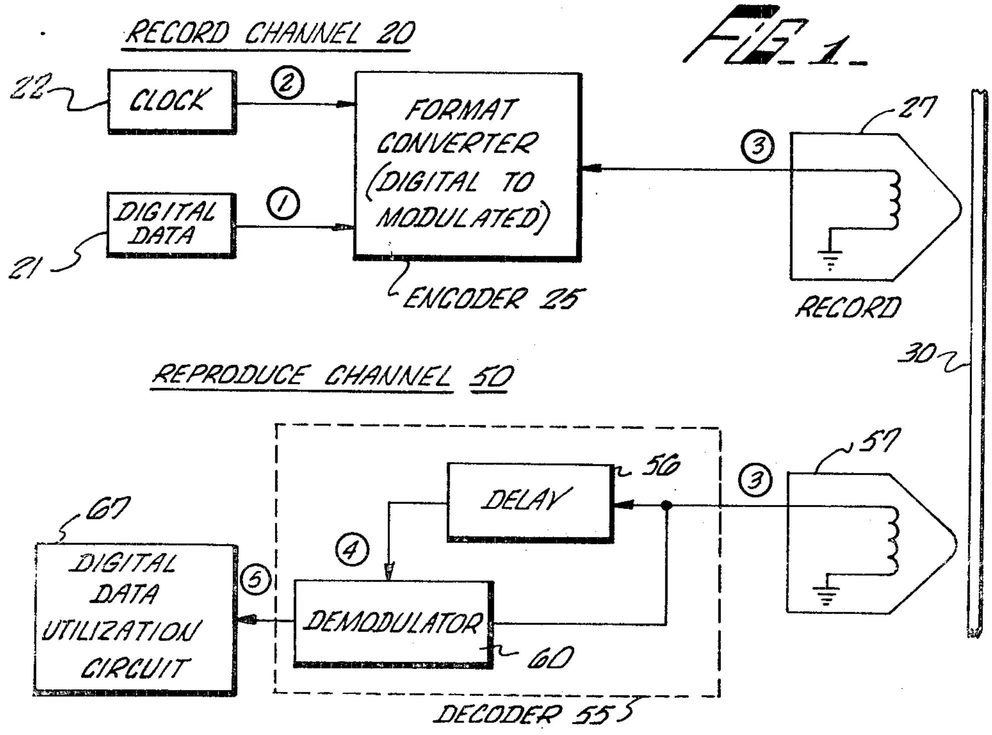
FIG. 1 is a block diagram of a high packing density record and reproduce system in accordance with the principles of this invention.
Figure 1A:
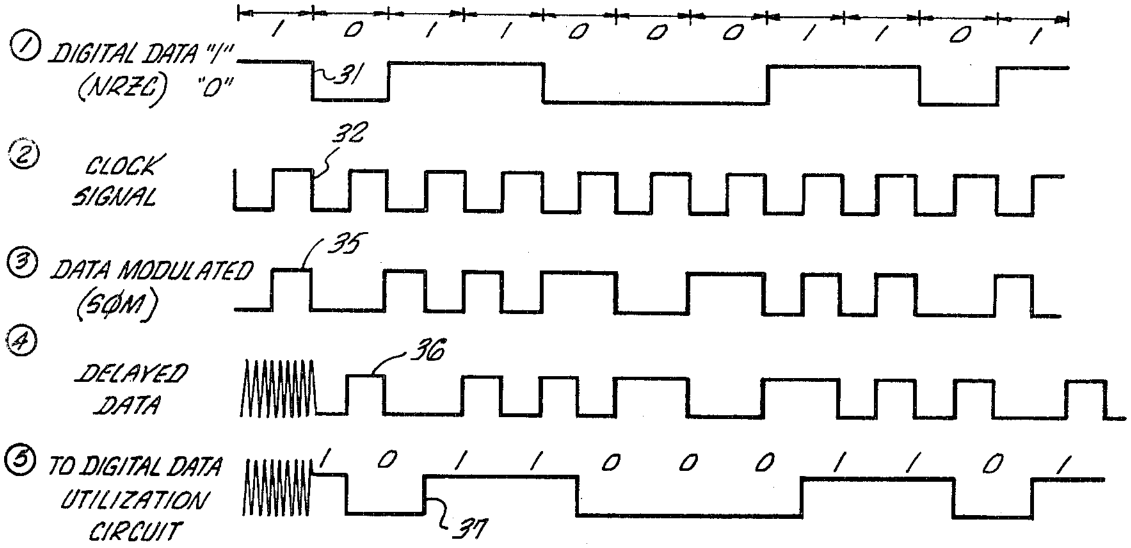
FIG. 1A is a chart of pulse and waveforms useful in promoting a clear understanding of the system of FIG. 1.

In FIG. 1A pulse waveforms are identified by encircled numbers. In FIG. 1 the waveforms of FIG. 1A are identified as to location by these encircled numbers. Thus, NRZC data is emitted from source 21, FIG. 1, as shown by the encircled number.

A clock source 22 applies a train of pulses to the format converter, or encoder, 25, which clock signal 32 is shown in the second row of FIG. 1A. It should be understood that a clock source such as clock source 22 is customarily available in all systems for recording digital data. In accordance with the principles of my invention, the clock signal 32 emitted by the clock source 22 serves as a carrier signal. This clock signal 32 has a frequency selected to make one complete cycle during a bit cell location. It may be any frequency within the systems' available bandwidth for the embodiment of FIG. 1. Current record and reproduce systems exhibit a bandwidth having signal to noise ratio of approximately 30 decibels from 0 to 10 kilocycles per second per linear recording inch. The signal to noise ratio drops to approximately 18 or 20 decibels at a frequency of approximately 15,000 cycles per second per inch. Accordingly, the frequency of the clock signal 32 may vary for the circuits of FIG. 1 up to approximately 18,000 cycles per second per inch for current systems, although obviously this invention is not limited to such frequencies. The digital data pulse train 31 of source 21 serves as a modulating signal for the carrier signal represented by clock signal 32 of source 22. The output of format converter 25 is thus a digital data modulated carrier signal shown in row 3 of FIG. 1A as a data modulated signal 35. This data modulated signal 35 is referred to as a split-phase-mark (SϕM) signal, in that a transition occurs at the beginning of every bit period; with a "1" represented by an additional midbit transition; and a "0" is represented by no midbit transition.

The data modulated signal 35 is shown in FIG. 1A substantially as a square wave but as will be explained in more detail hereinafter in connection with FIGS. 2 and 2A, such a modulated signal is recorded on the magnetic surface as a continuous phase-modulated wave. The modulated signal 35 of FIG. 1A is recorded on surface 30 by any conventional record transducer, or head 27. Typically record head 27 contacts or rides adjacent to a magnetic recording medium 30 and in response to signals applied thereto induces flux patterns on the magnetic surface. In my invention, no attempt is made to establish saturated flux reversals for "1" and "0" as is so common in the prior art. Rather, the record head 27 records signal 35 on magnetic surface 30 as a continually varying flux pattern in which the digital information is represented by flux variations corresponding to phase variations in the modulated signal 35.

Relative movement between magnetic surface 30 and a reproduce transducer, or head 57, converts the continually varying flux patterns on magnetic surface 30 back to a data modulated signal 35. It should be understood that the output waveform from reproduce head 57 contains the digital data in phase-modulated form and must be restored to a suitable digital data pulse pattern utilizing at least two discrete levels so as to be readily available for conventional digital utilization circuitry.

Reliance on any exterior or derived clock train, or integration, rectification, or peak detection operations which exemplify the prior art, are avoided by my reproduce channel 50. The data modulated signal 35 from a reproduce head 57 is applied to a decoder circuit 55 which includes a delay circuit 56 and a demodulator 60. It is well known that many precise and highly stable delay devices are currently available having wide ranges of delay. Any such conventional delay 56 may be employed. A delay of one-bit cell interval has been chosen for purposes of illustrating my data recovery technique. A fixed one-bit cell delay is shown at row 4 of FIG. 1A wherein the delayed data signal 36 appears one-bit cell interval late compared to the appearance of data signal 35.

It should be noted that the phase modulated data signal 35 is, of necessity, a random sequence of phase modulated signals. This random sequence of phase modulated signals is determined by the original, and likewise random, pattern of "1" and "0" provided by the source of digital data 21. Inasmuch as the digital data is contained in modulated form in the phase modulated signal 35, a delay of one-bit cell in delay circuit 56, in essence, selects one data bit in delayed form as a basis for a phase comparison with the first digital bit to be ascertained. The phase of the delayed bit when compared with the phase of this first bit, provides a unique method for determining the digital value of the first bit. For example, if the phases of the delayed and first bit when compared are similar, then one discrete digital level and value is represented; whereas if the phase of the delayed bit and the first bit to be ascertained are different, the other discrete digital level and value is indicated. The employment of this delayed signal thus provides a novel timing reference for recovering the data in the form of a differential phase detection technique.

A digital data utilization circuit 67, FIG. 1, is connected to the output of demodulator 60 for utilizing the NRZC data signal 37, row 5 FIG. 1A, which is emitted at the output of demodulator 60. It is readily apparent that the employment of the delay circuit 56 and demodulator 60 has restored the digital data modulated signal 35 to its original digital form 31 without any recovery clock source and without utilizing any of the conventional recovery techniques such as differentiation or peak detection as used by the prior art. Such prior art techniques involve inherent speed and signal-to-noise limitations which heretofore has prevented the attainment of any packing densities above approximately 5,000 per inch under the most closely controlled laboratory conditions as reported by some costly and highly experimental units. I have attained by my invention, a commercially acceptable system which operates over wide ranges of temperature and without costly hand selection of components. In my system packing densities as high as 30,000 bits per inch with reliability consistently better than one error in $10^6$ bits of data is readily attainable.

Figure 2:
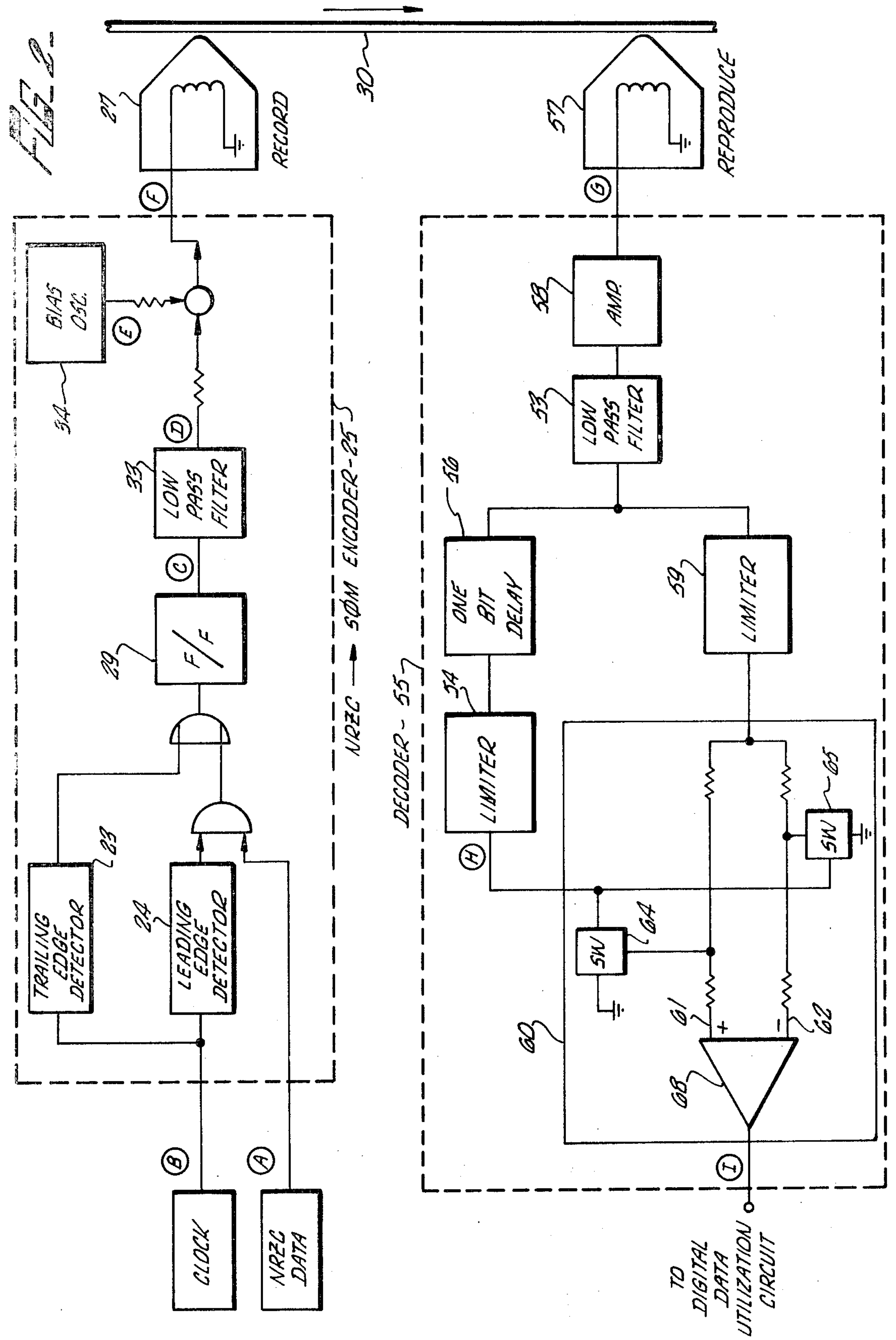
FIG. 2 is a combined block diagram and circuit schematic of the high packing density system of this invention.

Reference to FIG. 2, which is a more detailed circuit schematic of the system of FIG. 1, readily depicts the simplicity of the components utilized in my invention. In FIG. 2, components which correspond to substantially the same components as FIG. 1 are designated by the same numbers. Thus, the format converter 25 is depicted as receiving two inputs which are the NRZC digital data signal 31 shown at row A in FIG. 2A and the clock signal 32 shown at row B in FIG. 2A. The format converter 25 includes a pair of detectors 23, 24 which receive the clock signal 32. The pair comprises a trailing edge detector circuit 23 and a leading edge detector circuit 24. These detector circuits are well known and may be any suitable detector circuit of the prior art. An AND-gate 26 receives the output emitted from the leading edge detector 24 and also receives, as its other input, NRZC data 31 from input source 21. AND-gate 26 delivers an output indication to an OR-gate 28 when its input conditions from the leading edge detector 24 and the NRZC data source 21 are true. A second input to OR-gate 28 is the output from the trailing edge detector 23. OR-gate 28 triggers any standard flip-flop toggle circuit 29 so that one change of state of flip-flop 29 is generated for each input signal it receives from OR-gate 28.

Figure 2A:
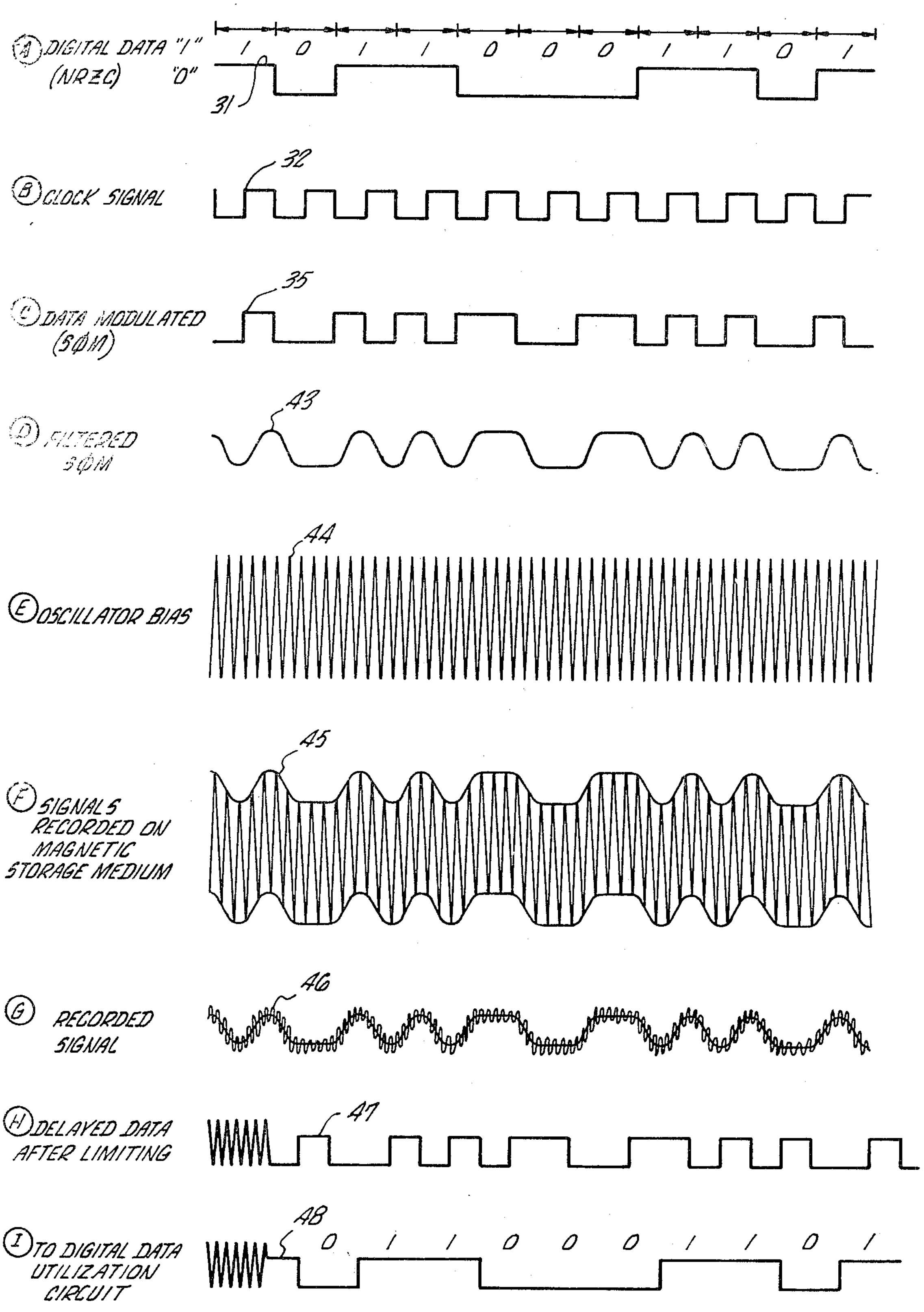
FIG. 2A is a chart of pulse and wave forms useful in promoting a clear understanding of FIG. 2.

Reference to row B of FIG. 2A discloses that the clocking signal 32 has a leading edge going positive at the center of each bit cell and it has a trailing edge going from a positive to a "0" or negative level at the end of each bit cell. Accordingly, the leading edge of clock signal 32 at the middle of the first bit cell is detected by circuit 24 and coincides with a positive level from the data source 21 at AND-gate 26 to form a trigger input pulse for flip-flop 29. Flip-flop 29 changes state and produces the first pulse in the data modulated split-phase-mark signal 35 as shown in row C of FIG. 2A. The trailing edge detector 23 then detects the end of the bit cell and again pulses flip-flop 29 causing another change of state and presenting a negative level to the low-pass filter 33 during the second bit cell. This operation just described continues for the remaining "1s" and "0s" and the output from flip-flop toggle circuit 29 emits the split-phase-mark format shown at row C in FIG. 2A.

Figure 4:
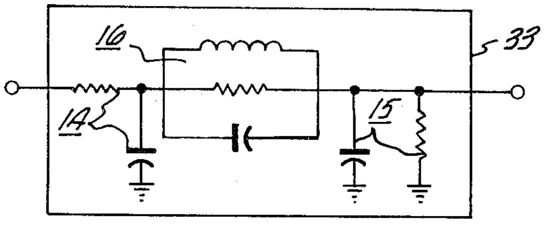
FIG. 4 is a circuit schematic of one suitable filter for FIGS. 2 and 3.

The low-pass filter circuit 33 may be any suitable broadband low-pass filter circuit known in the prior art. One such suitable filter is depicted in FIG. 4 and comprises resistive and capacitive input and output sections 14 and 15 interconnected by a parallel ladder branch section 16. The branch section comprises an inductor, a resistor and a capacitor. The filtered and smoothed output signal 43 from filter 33 is shown at row D in FIG. 2A.

Although the filtered data signal 43 may be stored on magnetic surface 30 directly by record head 27, I have found additional reliability and error free recording is available by summing filtered signal 43 with a suitable high-frequency bias signal 44 (Row E, FIG. 2A) emitted by bias oscillator 34. The frequency for the output of bias oscillator 34 may conveniently be several times the frequency and amplitude of the clock signal 32. For example, the oscillator bias signal 44 may be selected at a frequency that is five times greater than the frequency of the data signal 43.

This bias oscillator signal 44 linearizes, upon recording, the filtered split-phase-mark data signal 43, and thus tends to eliminate any harmonics which may be present in the low-frequency data components. These harmonics at some bit densities within the wide capabilities of this invention may interfere with the higher frequency data at such bit densities and could be mistaken by the demodulator as data. The use of the bias oscillator alone, or together with filter 33 as required, provides substantially error-free recovery of digital data over a wide range of bit densities.

As one example, the low-pass filter circuit 33 may be utilized at packing densities such as 10,000 bits per inch. At such a packing density, filter 33 passes all frequencies below the bit rate which would in this instance by 10,000 cycles per second per inch for clock signal 32. Selecting the low-pass filter with this range of low-pass frequencies eliminates the fifth harmonic from the input signal so that it does not interfere with the bias frequency of oscillator 34 which in the example just given would have an oscillating frequency at 50,000 cycles per second. As another example, highly satisfactory operation has been achieved at rates as high as 50,000 bits per second at a tape speed of 2½ inches per second, or a packing density of 20,000 bits per linear inch. For this example the oscillator bias may be set at 500,000 cycles per second. The low-pass filter 33 is not necessary for this application, and the nonfiltered split-phase-mark digital data signal 35 may be summed directly with the oscillator bias signal 44.

Head 27 applies a phase modulated envelope 45 to the magnetic surface 30. Although tests have not proved conclusively what flux patterns exist on the magnetic surface, it is believed that the high-frequency bias of envelope 45 erases itself once it has been stored on the magnetic surface 30. This erasure is accomplished by what is believed to be self-demagnetization of the flux reversals induced at the magnetic surface 30. The resulting flux pattern which is present on magnetic surface 30 between the record and the reproduce operations is a continually varying residual or remnant flux pattern approximately as depicted by the filtered data modulated signal 46, FIG. 2A.

During reproduce operations, this continuously varying residual flux pattern induces a signal 46 into the reproduce head 57 which signal includes some high-frequency noise. This output signal 46, as recovered, is shown at row G in FIG. 2A. Recovered signal 46 is amplified by any suitable reproduce amplifier 58 as known in the art, and is passed through a low-pass filter 53 of the type described hereinbefore. Limiter circuit 59 squares the filtered signal into its original split-phase-mark form such as shown in row C of FIG. 2A. A one-bit delay circuit 56 delays the filtered signal 46 which delayed signal is also limited by a limiter circuit 60 and in its delayed and limited form, as shown in row II of FIG. 2A, is presented to a demodulator 60 which may be any suitable demodulator such as a double balanced demodulator. In FIG. 2, a double balanced demodulator 60 of conventional form is shown comprising a differential amplifier 63 having standard resistive inputs to a plus and negative input side thereof. The recovered data modulated signal (substantially signal 35 of row C, FIG. 2A) is applied to the input terminals 61 and 62 of the differential amplifier 63. The delayed data signal 47 (row II of FIG. 2A) is applied by limiter 54 to a pair of switches 64, 65, of any well-known type which respond to opposite polarity signals for alternately completing a circuit to ground for terminals 61 and 62. These switches 64, 65 are on a mutually exclusive basis and only one switch is closed at any one instant. The following table describes a demodulating operation based upon a positive or negative level for the two input signals (substantially 35 and signal 47) as applied to demodulator 60:

TABLE I

| Signal | Input polarity | | | |
|---|---|---|---|---|
| Recovered $S\phi M$ signal | Positive | Positive | Negative | Negative. |
| Delayed $S\phi M$ signal | do | Negative | do | Positive. |
| Output signal from demodulator 60. | do | do | Positive | Negative. |

As shown in Table 1, a negative polarity signal emitted by limiter 54, together with a negative input to amplifier 63 from limiter circuit 59 results in a positive output signal which is the first pulse of signal train 48 shown in row I of FIG. 2A. The negative polarity signal from limiter 54 closes switch 64 and shorts the positive side of amplifier 63 to ground. Thus, the negative polarity signal from limiter 59 is applied to the negative terminal 62 of amplifier 63 and in standard differential amplifier operation a positive signal is emitted by amplifier 63. Switches 64 and 65 continue to operate under control and in accordance with the polarity of the signal emitted by limiter circuit 54. Differential amplifier 63, in accordance with the polarity of the input signal emitted from limiter circuit 59, responds to its grounded input conditions by emitting signal 48, FIG. 2A.

In accordance with the foregoing operation of my invention, a basic technique of phase modulating a carrier frequency with digital data represented by at least two discrete levels has been described. It is possible to double the bit density in accordance with the principles of my invention by utilizing a new and unique digital recording data format which, upon recovery, utilizes three distinct signal levels rather than two discrete levels as defined hereinbefore in connection with FIGS. 1 and 2. These three signal levels may be referred to as "plus," "minus" and "zero," and exist at these levels at the output of decoder 55 through the operation described hereinbefore.

To simplify the interpretation of these three discrete levels, the input wave is coded prior to its presentation to format converter 25. The NRZC data to the input of converter 25 is modified in NRZ–SPACE (hereinafter NRZ–S) by additional input circuitry for encoder 25. NRZ–S signals are formed by converting "0s" to transitions and by converting "1s" to no transitions. This additional encoding circuitry is added to the record channel 20 of my invention. In addition, a low-pass filter and a nonzero detector is added at the output of the reproduce channel 50 of my invention. The simple addition of these two circuits allows the employment of a clock signal, i.e., a carrier signal which has a frequency up to twice the frequency of the available bandwidth of the system.

Figures 3, 3A:
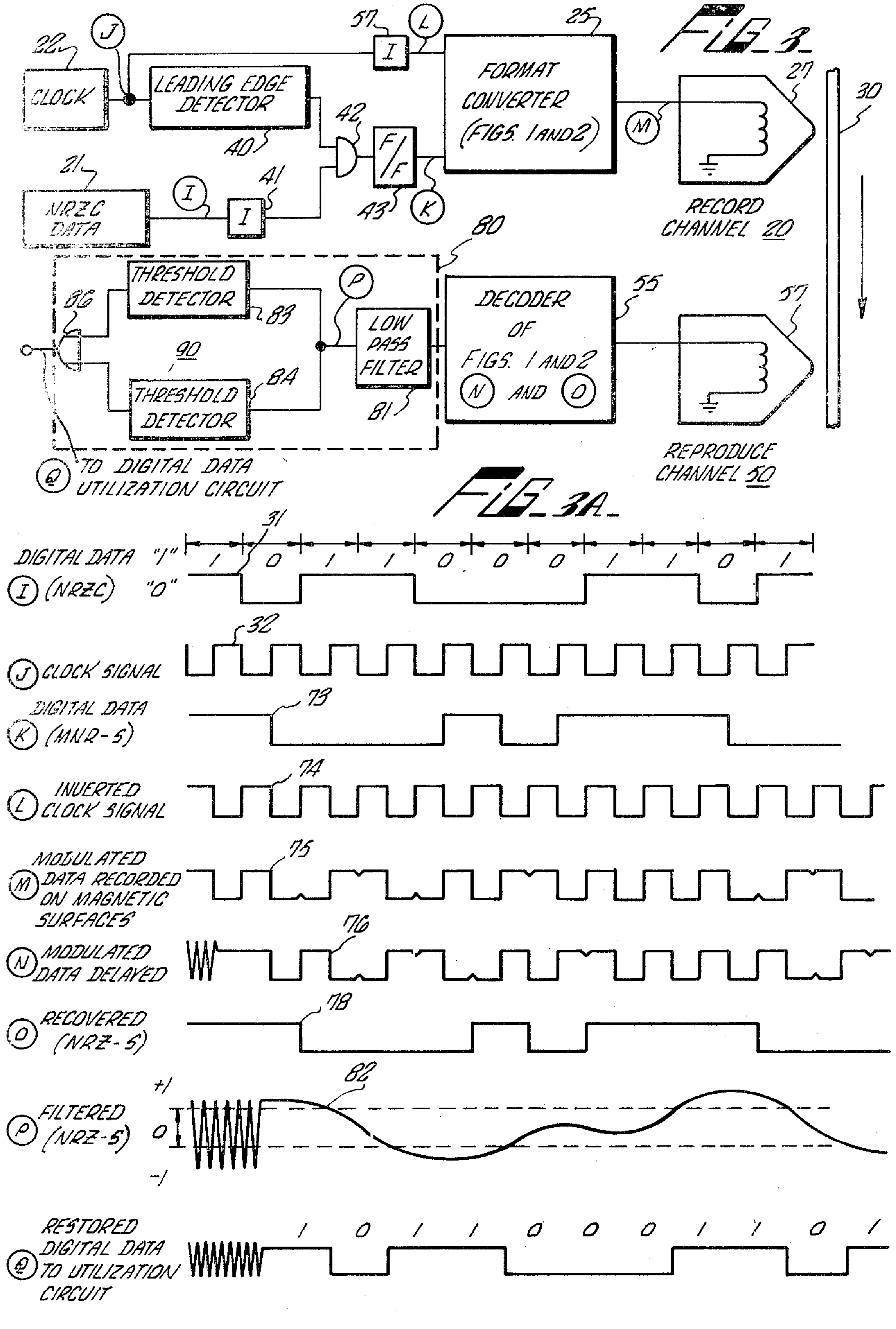
FIG. 3 is a combined block and circuit schematic diagram of a system having at least twice the bit density rate of the system of FIG. 1 in accordance with principles of this invention.
FIG. 3A is a chart of pulse and waveforms useful in promoting a clear understanding of FIG. 3.

This new and unique format and the means for generating and recovering it is described hereinafter in conjunction with FIG. 3 and FIG. 3A. In FIG. 3 the record channel 20 of FIGS. 1 and 2 is reproduced in block form as is the reproduce channel 50 of FIGS. 1 and 2. It should be understood that the operation for these record and reproduce channels 20 and 50 is identical to that previously described and thus need not be repeated with the description of FIG. 3.

In FIG. 3A the NRZC digital data 31 from source 21 is again employed as an illustration of the basic data format. Clock source 22 provides a high-frequency carrier which may be twice the bandwidth of the record and reproduce system. These two input trains 31 and 32 are depicted in rows I and J of FIG. 3A. A leading edge detector circuit 40 receives the carrier signal 32 and an inverter circuit 41 inverts the NRZC signal 31. An AND-gate 42 is connected to the output of the leading edge detector 40 and the inverter circuit 41 and its output is applied to a flip-flop toggle circuit 43. The flip-flop toggle circuit 43 changes state once for every input signal and its output is applied to the format converter 25 as the NRZ–S signal 73 shown in row K of FIG. 3. An additional inverter 57 inverts the carrier signal 32 and applies it to the format converter 25 as the carrier signal 74 shown in row L of FIG. 3A. This inverted carrier signal 74 is modulated with the NRZ–S signal 73 in the format converter 25 by the operations previously described in conjunction with FIGS. 1 and 2. This data modulated signal is again a random phase modulated wave 75 as shown in row M of FIG. 3A. As was true for the description of FIGS. 1 and 2, the modulated data may be filtered and biased prior to recording by head 27 on the magnetic surface 30. A reproduce head 57 recovers the modulated NRZ–S data, in the manner described hereinbefore, is again delayed (signal 76, row N, FIG. 3A) and demodulated so as to reconstruct the NRZ–S data wave train 78 shown in row 0 of FIG. 3A.

Comparison of FIG. 3A to FIG. 2A shows a bit cell that appears to be the same width for each of the pulse waveform charts. It should be understood, however, that the frequency or bit repetition rate of FIG. 3A may be twice the frequency and bit rate of the pulse waveform chart of FIGS. 1A and 2A. Thus, the bit cells of FIG. 3A are in actual operation extremely narrow in time duration and represent a frequency which may be as high as twice the upper frequency of the available bandwidth of the system. It is obvious, of course, that any system has a gradual transition from maximum to zero transmittence and does not have an absolute upper cutoff frequency. However, at some signal-to-noise ratio such as, for example, 18 to 20 decibels, a given system may be considered as having reached its upper frequency limit. If this upper frequency limit is referred to as $f_1$, then the maximum bit density for the system of FIG. 3 may be defined as $2f_1$.

When operating at $2f_1$, the decoder 55 of FIGS. 1 and 2 tries to change from a plus to a minus or from a minus to a plus but does not have time to reach either level before it is demodulating another digital value. This decoder 55, rather than emitting an NRZ–S signal 78 of row O, FIG. 3A, emits instead a continuously varying signal substantially like that of signal 82 shown in row P of FIG. 3A. Signal 82 is restored to a NRZC format by a ternary data detector circuit 80.

This ternary data detector circuit 80 includes a low-pass filter circuit 81 which is selected to pass frequencies up to $f_1$. Connected to the output of filter 81 is a positive threshold detector circuit 83 and a negative threshold detector circuit 84. An OR-gate 86 is connected to the outputs of detectors 83 and 84. As is shown in FIG. 3A by a comparison of the signals shown in rows P and Q, either detector 83 or detector 84 emits an output indication to OR-gate 86 whenever the input signal 82 is "not 0." Thus, whenever input signal 82 is greater or less than the "0" level shown between the two dashed horizontal lines, an output level of "1" is presented at OR-gate 86. These dashed lines, in standard detector operation, represent the threshold values for detectors 83 and 84. A "0" output is presented at OR-gate 86 whenever signal 82 is within these voltage levels shown as dashed lines. Thus, the "not zero" detector 80 restores signal 82 to an NRZC data format at bit rates which are twice as high as the upper cutoff frequency of the bandwidth of the system. It is to be noted, by comparing waveforms O and P, that waveforms P and Q have been illustrated as shifted by approximately one-bit cell with respect to the other waveforms I–O in FIG. 3A but that such illustrated wave shift is not necessarily produced by operation of the detector 80.

Although all prior descriptions of this invention have referred to one-track data handling capability, it should be understood that a plurality of data tracks may be provided for. Furthermore, it should be understood that more than one data train, or channel, could be handled by employing the principles of this invention in a phase multiplexed operation. Thus, rather than using a phase shift of 180° for one data channel, two or more data channels may be provided with phase shifts of 0° to 90° and 90° to 180° and both (or more) channels would be delayed one-bit interval, and thereafter phase separated in order to recover both separate data channels.

It is to be understood that the foregoing features and principles of this invention are merely descriptive, and that many departures and variations thereof are possible by those skilled in the art, without departing from the spirit and scope of this invention.

What is claimed is:

1. A system having a bandwidth including an upper frequency limit for transferring data relative to a magnetic medium wherein the data is provided to the system in at least two different data levels extending over sequentially appearing data bit cells, said system comprising:

first logic means for generating a transition for one of said data levels to another data level substantially at midbit cell time, and for maintaining said other data level free of any level transitions during its bit cell time;

means for emitting a clock signal having a frequency providing one cycle for each bit cell, said frequency being selected within the frequency range up to substantially twice said upper frequency limit of said system;

means connected to said clock signal emitting means and to said first logic means for modulating said clock signal with said signal generated by said logic means;

a signal transducer connected to said modulating means and operative for transferring said modulated signal relative to said magnetic medium;

a demodulator connected to said transducer for extracting said modulating signal from the modulated carrier transferred by said transducer from the medium;

detector means connected to said demodulator for converting the levels of said recovered modulating signal to a pattern corresponding to the data pattern initially applied to said logic means, said detector means including filter means having a passband for frequencies within said bandwidth for converting said levels of said modulating signal to a smoothed signal having a portion thereof varying above and below a reference level range; and second logic means for converting said variations from said reference level range to one of said initial data levels, and for converting the portions of said filtered signal within said reference level range to the other one of said initial data levels.

2. Apparatus for recording data on and reproducing said data from a magnetic medium, said data being in the form of a digital signal including a succession of either of two distinctive bits each represented by a different signal level, said apparatus comprising:

first converter means responsive to received digital signals for providing first signals having a format wherein first distinctive bits are represented by a transition between said different signal levels and second distinctive bits are represented by a lack of a transition between said different signal levels;

clock means for providing clock signals including a train of uniformly occurring pulses each defining a temporal period wherein said clock signal is successively maintained for equal periods at two different clock signal levels;

second converter means, responsive to signals received from said first converter means and said clock means, for providing modulated signals having a format of level variations dependent on the comparative signal levels of said first signals and said clock signals, when inverted, and on the temporal period of said clock signals;

transducer means for selectively transferring said modulated signals to and from said magnetic medium for recordation and reproduction, respectively;

first demodulator means for demodulating reproduced modulated signals to provide reproduced first signals; and second demodulator means for reconstructing said digital signals in response to said reproduced first signals.

3. The apparatus defined by claim 2 wherein said first converter means is adapted to receive clock signals from said clock means, said first converter means including:

detector means, operatively coupled to said clock means, for providing a detector signal corresponding to a midpoint of successive temporal periods defined by pulses of said clock signal;

inverter means, adapted to receive said digital signals, for providing inverted digital signals; and bistable gate means operatively coupled to receive said detector signals and said inverted digital signals for providing said first signals.

4. The apparatus defined by claim 3 wherein said bistable gate means includes:

an AND gate, adapted to receive said detector signals and said inverted digital signals, for providing an enabling signal in response to selected comparative levels of said detector signals and said inverted digital signals; and bistable means having two stable states and adapted to alternately assume said stable states in response to said enabling signals, said first signals being thereby developed.

5. The apparatus defined by claim 2 wherein said second demodulator means includes:

filter means for filtering said reproduced first signals applied thereto to produce a filtered signal having an amplitude that may vary between maximum and minimum amplitude levels including a 0 range, a greater than 0 range, and a lesser than 0 range;

first detector means for providing a bit signal in response to the amplitude of said filtered signal being in said greater than 0 range;

second detector means for providing a bit signal in response to the amplitude of said filtered signal being in said lesser than 0 range; and gate means, operatively coupled to receive said bit signals from said first and second detector means, for providing reconstructed digital signals, the presence of a bit signal representing one of said two distinctive bits, the nonpresence of a bit signal representing the other of said two distinctive bits.

6. The apparatus defined by claim 5 wherein said first converter means is adapted to receive clock signals from said clock means, said first converter means including:

detector means, operatively coupled to said clock means, for providing a detector signal corresponding to a midpoint of successive temporal periods defined by pulses of said clock signal;

inverter means, adapted to receive said digital signals, for providing inverted digital signals; and bistable gate means operatively coupled to receive said detector signals and said inverted digital signals for providing said first signals.

7. The apparatus defined by claim 6 wherein said bistable gate means includes:

an AND gate, adapted to receive said detector signals and said inverted digital signals, for providing an enabling signal in response to selected comparative levels of said detector signals and said inverted digital signals; and bistable means having two stable states and adapted to alternately assume said stable states in response to said enabling signals, said first signals being thereby developed.

* * * * *